UNITED STATES PATENT OFFICE.

FRANK BOLDUAN AND CLAIR S. DYAS, OF CHICAGO, ILLINOIS; SAID DYAS ASSIGNOR TO SAID BOLDUAN.

ANIMAL-POISONING PRODUCT.

No. 920,905.      Specification of Letters Patent.      Patented May 11, 1909.

Application filed May 28, 1908. Serial No. 435,471.

*To all whom it may concern:*

Be it known that we, FRANK BOLDUAN and CLAIR S. DYAS, both citizens of the United States, residing at Chicago, in the county of Cook and State of Illinois, have invented certain new and useful Improvements in an Animal-Poisoning Product, of which the following is a specification.

This invention relates to an animal poisoning food product, more especially adapted for use in farming districts in which gophers or other rodents and crows are found in such numbers as to prove materially destructive of grain; and the object of the present invention is to provide a poisonous food product, in the form of grain or other suitable material, which will be so impregnated with strychnine or other poison as to kill destructive animals.

It has previously been the practice to treat grain with soluble strychnine salts and thereafter distribute such grain in places frequented by destructive animals. This method of poisoning the animals is objectionable, for the reason that it is extremely wasteful of the poisoning agent in view of the fact that after the poisoned grain has been distributed the soluble poisonous salts will be washed out of the grain in large measure and thereby lost. Another objection lies in the fact that this method of treating grain is dangerous in the hands of inexperienced farmers or others who are likely to be poisoned in treating the grain. The present invention is intended to overcome the objections above noted, by treating the grain or other food with a soluble poisonous salt, preferably a salt of strychnine, and thereafter treating the impregnated grain with a suitable chemical agent which serves to transfer the soluble poisonous salt within the grain into an insoluble form so that the grain will remain thoroughly impregnated with the destructive poisonous agent regardless of the amount of moisture to which it is subjected when lying on the ground in the vicinity of gopher holes or the holes of other destructive animals.

The invention consists in the process and product hereinafter described and claimed.

The first step in the process is to take a suitable quantity of grain or other food product, as, for instance 100 pounds, and place the same in a vessel adapted to permit the liquid to drain off after the grain has been thoroughly soaked therein, dissolve about 12 oz. of a soluble poisoning salt, as, for instance, strychnine hydrochlorid, in 100 pints of hot water, and pour this solution on the grain and allow the latter to soak until thoroughly saturated. The grain will absorb a suitable amount of the liquid so applied, and the excess can be drained off and subsequently used. Experiment has shown that one pound of wheat will retain eight ounces of liquor, but it is necessary to provide an additional amount of the liquor in order to completely cover the grain placed in the soaking vessel. The next step in the process, after the strychnine solution is drained off, is to cover the wheat with a solution of soda bicarbonate, adding saccharin for sweetening, which serves to precipitate the alkaloid in the grain, thereby making a practical combination with the constituents of the grain. After allowing the grain to stand a sufficient time in the solution of soda bicarbonate to thus transform the grain constituents, the solution is drawn off from the grain, which latter is then dried by a fan or in any other suitable manner. In the reaction between the strychnine hydrochlorid and the soda bicarbonate, strychnine alkaloid, which is an insoluble form of strychnine, is precipitated, sodium chlorid or common salt forms, and carbon dioxid gas given off. This results in a chemical combination which is insoluble and incapable of being washed out of the grain by the action of the elements. It has been found impossible to satisfactorily apply strychnine alkaloid to the grain by external application, for the reason that the alkaloid being insoluble, does not penetrate the grain. By perfecting the transformation of a soluble into an insoluble form within the grain itself, the whole body of the grain will be permanently and evenly impregnated with the poisoning agent, which will be colorless and odorless and incapable of external detection by destructive animals or birds. At the same time a certain amount of ordinary salt will be formed by the reaction which renders the grain more attractive as food for destructive animals.

What we regard as new and desire to secure by Letters Patent is:

1. The process which consists in impregnating a permeable but insoluble food product with a solution of a poison, and thereafter transforming the soluble poison into an insoluble poison, substantially as described.

2. The process which consists in impregnating a permeable but insoluble food product with a solution of a poison, and thereafter immersing the grain in a solution adapted to transform the soluble poison into an insoluble poison, substantially as described.

3. The process which consists in impregnating a permeable but insoluble food product with a soluble poisonous salt, and thereafter immersing the grain in a solution adapted to transform the soluble salt into an insoluble form, substantially as described.

4. The process which consists in impregnating a permeable but insoluble food product with a solution of a soluble strychnine salt, and thereafter immersing the grain in a solution adapted to transform the soluble strychnine salt into an insoluble form, substantially as described.

5. The process which consists in impregnating a permeable but insoluble food product with a solution of a soluble strychnine salt, and thereafter treating the food product with sodium bicarbonate for depositing within the grain a strychnine alkaloid compound, substantially as described.

FRANK BOLDUAN.
CLAIR S. DYAS.

Witnesses:
N. H. SEIWERT,
EMIL A. ZUTZ.